United States Patent
Mendoza et al.

(10) Patent No.: US 10,672,002 B2
(45) Date of Patent: Jun. 2, 2020

(54) SYSTEMS AND METHODS FOR USING NONVISUAL COMMUNICATION TO OBTAIN PERMISSION FOR AUTHORIZING A TRANSACTION

(71) Applicant: MasterCard International Incorporated, Purchase, NY (US)

(72) Inventors: Epher Mendoza, Wildwood, MO (US); Michael Martel Spratt, Maryland Heights, MO (US); Rahul Deshpande, Chesterfield, MO (US); Akeda Hosten, St. Louis, MO (US); Stewart Boling, Maryland Heights, MO (US); Adam Axe, St. Louis, MO (US)

(73) Assignee: MasterCard International Incorporated, Purchase, NY (US)

( * ) Notice: Subject to any disclaimer, the term of this patent is extended or adjusted under 35 U.S.C. 154(b) by 591 days.

(21) Appl. No.: 15/419,906

(22) Filed: Jan. 30, 2017

(65) Prior Publication Data

US 2018/0218367 A1 Aug. 2, 2018

(51) Int. Cl.
*G06Q 20/40* (2012.01)
*H04L 29/08* (2006.01)
(Continued)

(52) U.S. Cl.
CPC ......... *G06Q 20/4014* (2013.01); *G06Q 20/20* (2013.01); *G06Q 20/322* (2013.01);
(Continued)

(58) Field of Classification Search
CPC .. G06Q 20/4014; G06Q 20/20; G06Q 20/322; G06Q 20/3272; G06Q 20/4016; H04L 67/18
See application file for complete search history.

(56) References Cited

U.S. PATENT DOCUMENTS 6,327,575 B1 * 12/2001 Katz ................. G06F 3/147
235/7 R
7,490,758 B2 2/2009 Drummond et al.
(Continued)

FOREIGN PATENT DOCUMENTS

WO 2003/019905 A1 3/2003
WO WO-03019905 A1 * 3/2003 ............. G06Q 30/06
(Continued)

OTHER PUBLICATIONS

Hersh et al.: Assistive Technology for Visually Impaired and Blind People, 2008, Springer, pp. 1-753 (Year: 2008).*
(Continued)

*Primary Examiner* — Bijendra K Shrestha

(57) ABSTRACT

Embodiments of the disclosure enable permission to be obtained using nonvisual communication. A system receives a request for authorization of a transaction, identifies an account based on user identifier data included in the request, establishes a communication link with a user device associated with the user account, generates a prompt message identifying a merchant and a transaction amount associated with merchant identifier data and transaction data included in the request, analyze the prompt message to generate a prompt audibly perceivable at the user device, analyze a speech reply received from the user device to generate a feedback message, and analyze the feedback message to determine whether permission to authorize the transaction is obtained. Aspects of the disclosure provide for authorizing a transaction in a secure and user-friendly manner.

20 Claims, 8 Drawing Sheets

(51) Int. Cl.
*G06Q 20/32* (2012.01)
*G06Q 20/20* (2012.01)

(52) U.S. Cl.
CPC ..... *G06Q 20/3272* (2013.01); *G06Q 20/4016* (2013.01); *H04L 67/18* (2013.01)

(56) References Cited

U.S. PATENT DOCUMENTS

| | | | |
|---|---|---|---|
| 8,083,141 B1 | 12/2011 | Courtright | |
| 8,301,564 B2 | 10/2012 | Mon et al. | |
| 8,738,450 B2* | 5/2014 | Mon | G06Q 20/20 |
| | | | 705/16 |
| 8,917,825 B2* | 12/2014 | Beck | G06Q 20/102 |
| | | | 379/88.01 |
| 9,786,268 B1* | 10/2017 | Ledet | G10L 15/00 |
| 2002/0082995 A1 | 6/2002 | Samuel | |
| 2005/0199714 A1 | 9/2005 | Brandt et al. | |
| 2006/0202025 A1* | 9/2006 | Calabrese | G06Q 20/40 |
| | | | 235/380 |
| 2007/0100631 A1* | 5/2007 | Bodin | G06Q 10/109 |
| | | | 704/270 |
| 2009/0132351 A1* | 5/2009 | Gibson | G06Q 20/02 |
| | | | 705/12 |
| 2011/0196789 A1 | 8/2011 | Patton et al. | |
| 2013/0030999 A1 | 1/2013 | Chang et al. | |
| 2013/0080961 A1* | 3/2013 | Levien | H04L 51/24 |
| | | | 715/773 |
| 2013/0124411 A1 | 5/2013 | Kobres et al. | |
| 2013/0346312 A1* | 12/2013 | Calabrese | G06Q 20/40 |
| | | | 705/44 |
| 2017/0357977 A1* | 12/2017 | Pitz | G06Q 20/202 |
| 2011/2581121 | 10/2018 | Sakari et al. | |
| 2019/0171414 A1* | 6/2019 | Zomet | G06F 3/167 |

FOREIGN PATENT DOCUMENTS

| | | | |
|---|---|---|---|
| WO | 2008/013657 A2 | 1/2008 | |
| WO | WO-2008013657 A2 * | 1/2008 | ............ G06Q 20/32 |

OTHER PUBLICATIONS

Greene et al.: Perception of synthetic speech produced automatically by rule: Inteligibility of eight text-to-speech systems, Mar. 1998, Behav Res Methods Instrum Comput., pp. 1-15. (Year: 1998).*

Khilari et al.: A Review on Speech to Text Conversion Methods, Jul. 2015, International Journal of Advanced Research in Computer Engineerting & Technology (IJARCET), vol. 4, Issue 7, pp. 3067-3072 (Year: 2015).*

Wolles, Bart, "International Search Report" and "Written Opinion", International Application No. PCT/US2017/067170, dated Apr. 6, 2018, 12 pages.

* cited by examiner

SYSTEMS AND METHODS FOR USING NONVISUAL COMMUNICATION TO OBTAIN PERMISSION FOR AUTHORIZING A TRANSACTION

FIELD OF THE DISCLOSURE

The subject matter described herein relates generally to information processing and, more specifically, to systems and methods for using nonvisual communication to obtain permission for authorizing one or more transactions.

BACKGROUND

Financial transaction cards have made great gains as a means to attract financial accounts to financial institutions and, in the case of credit cards, as a medium to create small loans and generate interest income for financial institutions. However, fraudulent financial transactions involving credit cards and other similar payment mechanisms may result in huge losses for cardholders, merchants, banks, and other financial institutions. Known fraud detection methods and systems identify potentially fraudulent financial transactions to facilitate mitigating such losses.

Financial institutions are well-situated to identify fraudulent transactions. For example, financial institutions may analyze cardholder transaction histories to identify patterns in the cardholder transaction histories. A deviation from such patterns, for example, may be indicative of a potentially fraudulent financial transaction. In at least some situations, however, a cardholder may be better-situated to identify a fraudulent financial transaction.

SUMMARY

Embodiments of the disclosure enable a computing system to obtain cardholder permission using nonvisual communication to authorize one or more financial transactions. The computing system includes an interpreter configured to convert text to speech and speech to text, a memory device storing data associated with one or more cardholder accounts and computer-executable instructions, and a processor. The processor executes the computer-executable instructions to receive a request for authorization of a financial transaction, identify a cardholder account based on cardholder identifier data included in the request for authorization, establish a communication link between the interpreter and a user device associated with the cardholder account such that the computing system is configured to communicate with the user device, generate a prompt message identifying a merchant and one or more transaction amounts associated with merchant identifier data and transaction data included in the request for authorization, analyze the prompt message using the interpreter to generate an audible prompt audibly perceivable at the user device, analyze a speech reply received from the user device using the interpreter to generate a feedback message, and analyze the feedback message to determine whether cardholder permission to authorize the financial transaction is obtained.

In another aspect, one or more computer storage media embodied with computer-executable instructions are provided. The computer storage media includes an identification component, a communication component, and a disposition component. The identification component receives a request for authorization of a financial transaction, and analyzes the request for authorization to identify a cardholder account, a merchant, and one or more transaction amounts associated with the request for authorization. The communication component establishes a communication link with a user device associated with the cardholder account, generates a prompt message identifying the merchant and the transaction amounts, converts the prompt message to an audible prompt, presents the audible prompt to the user device through the communication link, identifies a speech reply received from the user device through the communication link, and analyzes the speech reply to identify user feedback. The disposition component analyzes the user feedback to determine whether cardholder permission to authorize the financial transaction is obtained.

In yet another aspect, a computer-implemented method is provided for obtaining permission using nonvisual communication to authorize one or more transactions. The computer-implemented method includes receiving a request for authorization of a transaction, establishing a communication link with a user device associated with user identifier data included in the request for authorization, generating a prompt message configured to elicit confirmation of other user identifier data and transaction data included in the request for authorization, using the communication link to present a first nonvisual communication associated with the prompt message, receiving a second nonvisual communication associated with the prompt message, and analyzing the second nonvisual communication to determine whether permission to authorize the transaction is obtained.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
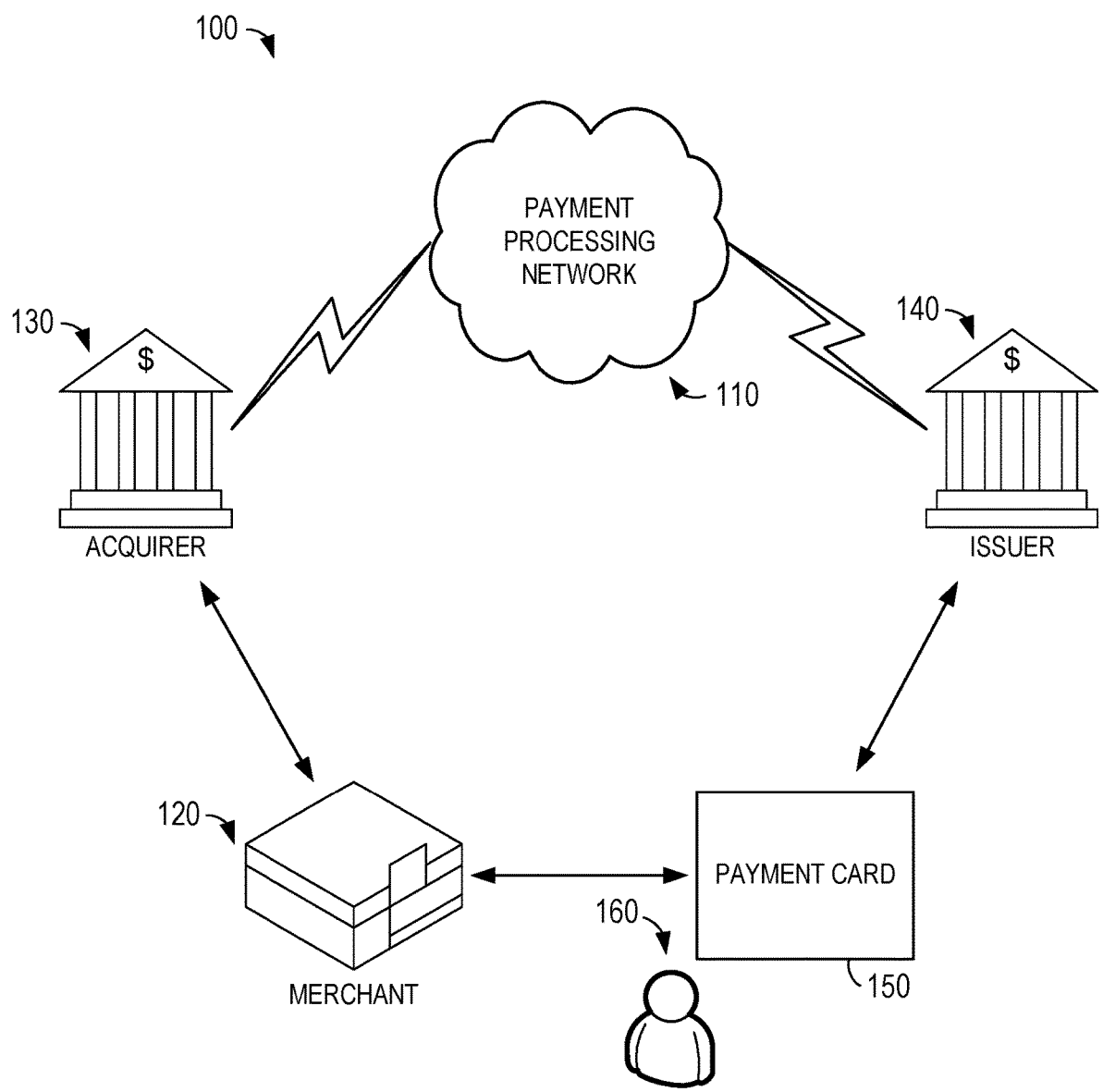
FIG. 1 is a block diagram illustrating an example environment for processing financial transactions.

The subject matter described herein relates to obtaining cardholder permission for authorizing one or more financial transactions. Embodiments of the disclosure enable permission to be obtained through an authorized channel. A communication link may be established with a user device, for example, using device identifier data registered with a cardholder account. In this manner, permission to authorize a financial transaction may be obtained from a user of a registered user device before authorizing the financial transaction. In some embodiments, the communication link enables permission to be obtained using nonvisual communication.

The embodiments described herein may receive a request for authorization of a financial transaction, identify a cardholder account based on cardholder identifier data included in the request for authorization, establish a communication link with a user device associated with the cardholder account, generate a prompt message identifying a merchant and one or more transaction amounts associated with merchant identifier data and transaction data included in the request for authorization, analyze the prompt message to generate an audible prompt audibly perceivable at the user device, analyze a speech reply received from the user device to generate a feedback message, and analyze the feedback message to determine whether cardholder permission to authorize the financial transaction is obtained.

While no personally identifiable information is tracked by the embodiments described herein, the embodiments have been described with reference to data being monitored and/or collected from one or more users. The data may be monitored and/or collected in accordance with applicable data privacy laws and regulations. For example, notice may be provided to the users (e.g., via a dialog box or preference setting), and/or users may be given the opportunity to give or deny consent for the monitoring and/or collection of the data. The consent may take the form of opt-in consent or opt-out consent.

Aspects of the disclosure provide for a computing system that performs one or more operations in an environment including a plurality of devices coupled to each other via a network (e.g., a local area network (LAN), a wide area network (WAN), the Internet). For example, a financial transaction processing computing device may communicate with one or more merchant devices and/or user devices to authorize one or more financial transactions and/or to obtain cardholder permission for authorizing the financial transactions. In some embodiments, the financial transaction processing computing device uses data received from a merchant device to identify data associated with a user device for establishing a communication link with the user device. The communication link may be established, for example, to obtain cardholder permission.

The systems and processes described herein may be implemented using computer programming or engineering techniques including computer software, firmware, hardware or a combination or subset thereof. At least one technical problem with known computing systems is that it can be difficult, time-consuming, and/or onerous to identify at least some fraudulent financial transactions. The embodiments described herein address at least this technical problem. By obtaining cardholder permission to authorize one or more financial transactions in the manner described in this disclosure, some embodiments improve user experience, user efficiency, user interaction performance, and/or user confidence in financial institutions and/or in payment processing networks by involving a cardholder in a fraud detection and/or transaction authorization process. Additionally, some embodiments improve data integrity, data transmission security, and/or communication between systems by using a communication link with a registered communication device to control communications; and/or reduce error rate by automating at least a portion of the fraud detection and/or transaction authorization process. Moreover, some embodiments may facilitate improving processor speed, processor security, and/or operating system resource allocation.

The technical effect of the systems and processes described herein is achieved by performing at least one of the following operations: a) receive a request for authorization of a financial transaction; b) identify a cardholder account associated with the request for authorization; c) determine whether the cardholder account is enrolled in a nonvisual communication program; d) access the cardholder account to retrieve contact data associated with a user device; e) establish a communication link with the user device; f) generate a prompt message identifying a merchant, one or more transaction amounts, and/or one or more products associated with the financial transaction; g) analyze the prompt message to generate an audible prompt; h) present the audible prompt to the user device through the communication link; i) identify a speech reply received from the user device through the communication link; j) analyze the speech reply to generate a feedback message and/or user feedback; k) analyze the feedback message and/or user feedback to determine whether cardholder permission to authorize the financial transaction is obtained and/or whether one or more products are associated with the cardholder permission; l) access the cardholder account to retrieve voiceprint data; m) compare the speech reply with the voiceprint data to determine whether a user of the user device is associated with the cardholder account; n) identify a location of a merchant device; o) receive geolocation data associated with the user device; p) analyze the geolocation data to determine whether the user device is proximate to the location of the merchant device; q) generate a response to the request for authorization; r) transmit the response to the request for authorization; s) generate a confirmation message identifying a disposition of the request for authorization; t) analyze the confirmation message to generate an audible confirmation; or u) present the audible confirmation to the user device through the communication link.

FIG. 1 is a block diagram illustrating an example environment 100 for processing one or more financial transactions. The environment 100 includes a processing network 110, such as the MASTERCARD® brand payment processing network (MASTERCARD® is a registered trademark of MasterCard International Incorporated located in Purchase, N.Y.). The MASTERCARD® brand payment processing network is a propriety network for exchanging financial transaction data between members of the MASTERCARD® brand payment processing network.

The environment 100 includes one or more merchants 120 that accept payment via the processing network 110. To accept payment via the processing network 110, the merchant 120 establishes a financial account with an acquirer 130 that is a member of the processing network 110. The acquirer 130 is a financial institution that maintains a relationship with one or more merchants 120 to enable the merchants 120 to accept payment via the processing network 110. The acquirer 130 may also be known as an acquiring bank, a processing bank, or a merchant bank.

The environment 100 includes one or more issuers 140 that issue or provide one or more payment cards 150 to one or more cardholders 160 or, more broadly, account holders ("cardholder" and "account holder" may be used interchangeably herein). An issuer 140 is a financial institution that maintains a relationship with a cardholder 160 to enable the cardholder 160 to make a payment using a payment card 150 via the processing network 110. As described herein, the term "payment card" includes credit cards, debit cards, prepaid cards, key fobs, digital cards, smart cards, and any other payment product that is linked or associated with a corresponding cardholder account maintained by the issuer 140.

The cardholder 160 may use the payment card 150 to enter into one or more financial transactions with one or more merchants 120. The payment card 150 may have any shape, size, or configuration that enables the cardholder 160 to make a payment to a merchant 120 using a cardholder account. For example, account information stored in a microchip or magnetic stripe on the payment card 150 may be used to identify a cardholder account associated with the payment card 150. In some embodiments, the payment card 150 uses mobile payment technology and/or contactless payment technology to facilitate communication between the cardholder 160 and the merchant 120. For example, the payment card 150 may include or be associated with a radio frequency identification (RFID)-enabled device, a BLUETOOTH® brand wireless technology-enabled device, a WI-FI® brand local area wireless computing network-enabled device, and/or a near field communication (NFC) wireless communication-enabled device. (BLUETOOTH® is a registered trademark of Bluetooth Special Interest Group, and WI-FI® is a registered trademark of the Wi-Fi Alliance).

In some embodiments, the cardholder 160 presents the merchant 120 with the payment card 150 to make a payment to the merchant 120 using the cardholder account in exchange for the good or service. Alternatively, the cardholder 160 may provide the merchant 120 with account information associated with the payment card 150 without physically presenting the payment card 150 to the merchant 120 (e.g., for remote financial transactions, including e-commerce transactions, card-not-present transactions, or card-on-file transactions). Account information may include, for example, a name of the cardholder 160, an account number, an expiration date, and/or a security code (e.g., a card verification value (CVV), a card verification code (CVC), a personal identification number (PIN)).

The merchant 120 requests authorization from an acquirer 130 for at least the amount of the purchase. The merchant 120 may request authorization using any financial transaction computing device configured to transmit account information of the cardholder 160 to one or more financial transaction processing computing devices of the acquirer 130. For example, the merchant 120 may use a point-of-sale (POS) terminal that reads account information from the microchip or magnetic stripe on the payment card 150 and transmits the account information to a financial transaction processing computing device of the acquirer 130. Additionally or alternatively, the POS terminal may receive the account information from a communication device using mobile payment technology and/or contactless payment technology, and transmit the account information to the financial transaction processing computing device of the acquirer 130.

Using the processing network 110, the financial transaction processing computing device of the acquirer 130 communicates with one or more financial transaction processing computing devices of an issuer 140 to determine whether the account information of the cardholder 160 matches or corresponds to the account information of the issuer 140, whether the cardholder account is in good standing, and/or whether the purchase is covered by an available credit line or account balance associated with the cardholder account (e.g., a purchase amount is less than an account capacity). Based on these determinations, a financial transaction processing computing device of the issuer 140 determines whether to approve or decline the request for authorization from the merchant 120.

If the request for authorization is declined, the merchant 120 is notified (e.g., via the processing network 110) as such, and may request authorization from the acquirer 130 for a lesser amount or request an alternative form of payment (e.g., cash, another payment card 150) from the cardholder 160. If the request for authorization is approved, an authorization code is issued (e.g., via the processing network 110) to the merchant 120, and the available credit line or account balance associated with the cardholder account is decreased by at least the amount of the purchase. The financial transaction is then settled between the merchant 120, the acquirer 130, the issuer 140, and/or the cardholder 160. Settlement typically includes the acquirer 130 reimbursing the merchant 120 for selling the good or service, and the issuer 140 reimbursing the acquirer for reimbursing the merchant 120. When a credit card is used, the issuer 140 may bill the cardholder 160 to settle the cardholder account (e.g., a credit card account) with the cardholder 160. When a debit or prepaid card is used, the issuer 140 may automatically withdraw funds from the cardholder account (e.g., a checking account, a savings account) to settle the cardholder account.

Figure 2:
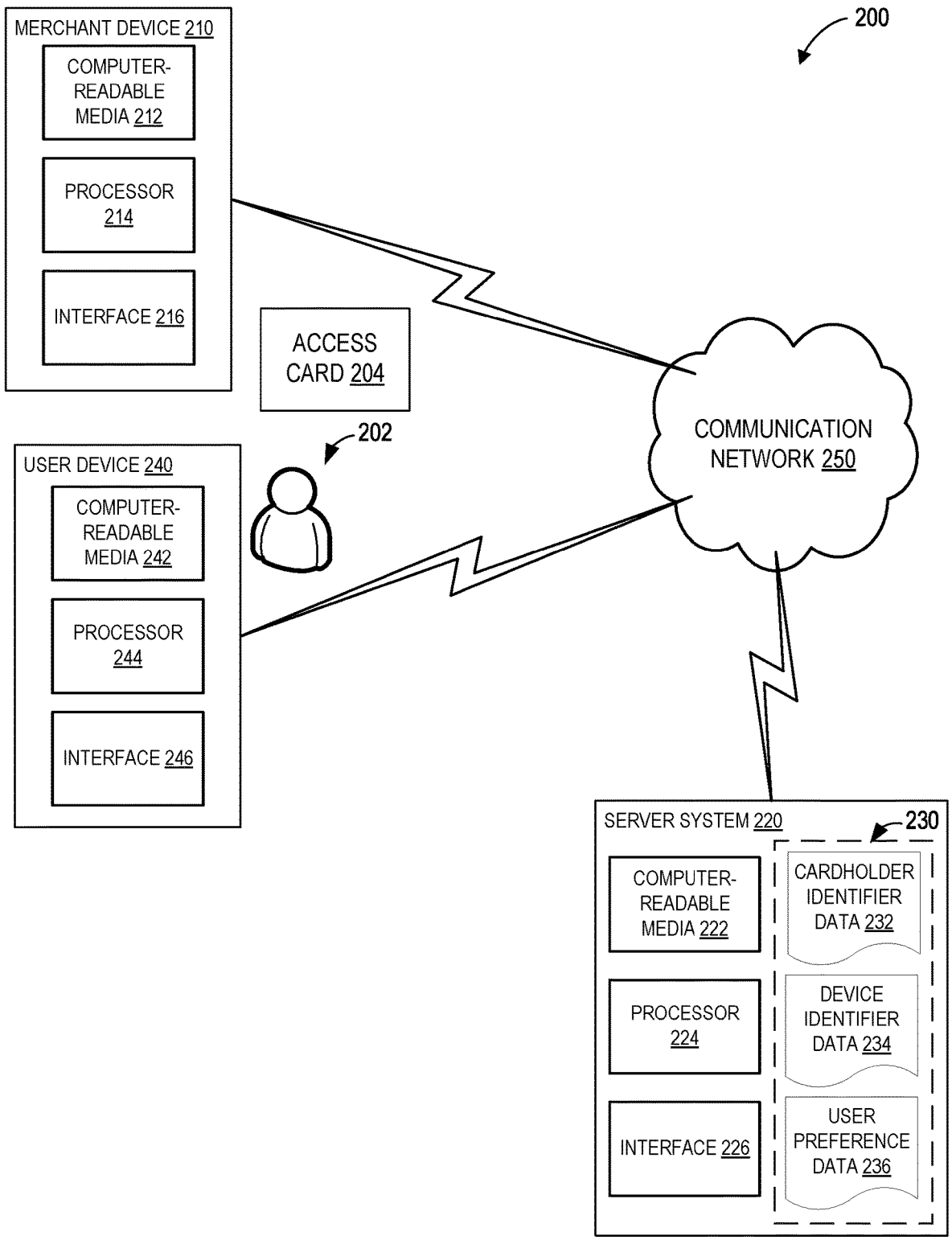
FIG. 2 is a block diagram illustrating an example ecosystem for obtaining cardholder permission in an environment, such as the environment shown in FIG. 1.

FIG. 2 is a block diagram illustrating an example ecosystem 200 that allows a user 202 (e.g., cardholder 160) to enter into one or more financial transactions and/or to give permission to authorize one or more financial transactions. An access card 204 (e.g., payment card 150), for example, may be used to enter into a financial transaction. The access card 204 may include a microchip and/or magnetic stripe that are scannable by a reader and/or readable over a distance (e.g., via mobile payment and/or contactless payment technologies). An EMV® brand smart card, for example, may store account information in the microchip and create a unique transaction code for each transaction. (EMV® is a registered trademark of EMVCo, LLC). In some embodiments, the user 202 presents the access card 204 to a merchant device 210 (e.g., POS terminal) to enter into the financial transaction.

The merchant device 210 includes one or more memory devices or computer-readable media 212 storing computer-executable instructions, and one or more processors 214 configured to execute the computer-executable instructions to perform one or more operations. The merchant device 210 may use one or more interfaces 216 to present information to and/or receive user input from one or more users of the merchant device 210 (e.g., merchant 120, user 202). For example, the merchant device 210 may use the interfaces 216 to receive account information (e.g., cardholder identifier data, expiration date, security code) from the access card 204 for entering into a financial transaction using a cardholder account. In some embodiments, the interfaces 216 read or receive account information from the microchip or magnetic stripe on the access card 204. Additionally, the interfaces 216 may be used to transmit data to and/or receive data from one or more other computing systems. For example, the merchant device 210 may use the interface 216 to transmit a request for authorization to a server system 220 (e.g., a financial transaction processing computing device of the issuer 140) that stores and maintains account data associated with one or more cardholder accounts.

The server system 220 includes one or more memory devices or computer-readable media 222 storing computer-executable instructions, and one or more processors 224 configured to execute the computer-executable instructions to perform one or more operations. In some embodiments, the server system 220 uses one or more applications (apps) to perform one or more functions. A payment card application, for example, may be used to process one or more financial transactions.

In some embodiments, the server system 220 includes one or more server-side applications that enable client-side services to be provided at one or more other computing systems. The server system 220 may use one or more interfaces 226 to transmit data to and/or receive data from the other computing systems (e.g., merchant device 210). For example, the server system 220 may use the interfaces 226 to receive the request for authorization from the merchant device 210, and to transmit a response to the request to the merchant device 210. Additionally, the interfaces 226 may be used to present information to and/or receive user input from one or more users of the server system 220 (e.g., issuer 140).

In response to receiving the request for authorization, the server system 220 identifies a cardholder account used to enter into the financial transaction. For example, the request for authorization may be analyzed to identify account information, such as cardholder identifier data, an expiration date, and/or a security code. The account information may be used to identify or select, from the cardholder accounts stored and maintained at the server system 220, a first cardholder account 230 associated with the financial transaction. The first cardholder account 230 may include or be associated with, for example, cardholder identifier data 232 (e.g., cardholder account number, username, PIN, password, public key infrastructure (PM) certificate, token, biometric data) that corresponds to the account information associated with the request for authorization. The first cardholder account 230 may also include or be associated with other account data, such as device identifier data 234 (e.g., telephone number, BLUETOOTH® brand wireless technology identifier, routing number, Internet Protocol (IP) address, media access controller (MAC) address, NFC identifier, RFID identifier) and/or user preference data 236.

The server system 220 analyzes the account data associated with the first cardholder account 230 to process the financial transaction. For example, the server system 220 may identify an account threshold (e.g., available credit line, available account balance) associated with the first cardholder account 230, and determine whether the transaction amount satisfies the account threshold. If the transaction amount satisfies the account threshold (e.g., the transaction amount is less than or equal to the account threshold), the server system 220 approves the request for authorization and generates a response to the request in accordance with the approval. On the other hand, if the transaction amount does not satisfy the account threshold (e.g., the transaction amount is greater than the account threshold), the server system 220 declines the request for authorization and generates a response to the request in accordance with the declination.

In some embodiments, the server system 220 determines whether the first cardholder account 230 is enrolled in or associated with a nonvisual communication program. A cardholder account may be enrolled in the nonvisual communication program, for example, if a cardholder is blind or prefers to communicate using one or more nonvisual communications, such as an audible communication and/or a tactile communication. User preference data 236 may be used to indicate an enrollment status of the first cardholder account 230. In this manner, the first cardholder account 230 may be accessed to retrieve user preference data 236 for determining whether the first cardholder account 230 is associated with the nonvisual communication program. If the first cardholder account 230 is associated with the nonvisual communication program, the server system 220 communicates with the user 202 using nonvisual communication. The server system 220 may communicate with the user 202, for example, to obtain permission for authorizing one or more financial transactions.

In some embodiments, the server system 220 establishes a communication link with a user device 240 to communicate with the user 202. The communication link enables communication to be transmitted between the server system 220 and the user device 240. Contact data associated with the user device 240 may be used to establish the communication link with the user device 240. Any data that enables an entity (e.g., user 202, user device 240) to be located and/or approached for communicating with the entity may be used as contact data. In this manner, the first cardholder account 230 may be accessed to retrieve device identifier data 234 for establishing the communication link with a user device 240 associated with the device identifier data 234.

The user device 240 includes one or more memory devices or computer-readable media 242 storing computer-executable instructions, and one or more processors 244 configured to execute the computer-executable instructions to perform one or more operations. In some embodiments, the user device 240 uses one or more applications to perform one or more functions. A payment card application, for example, may be used to facilitate one or more financial transactions. For another example, a geolocation application may allow a geolocation of the user device 240 and/or a user of the user device 240 (e.g., user 202) to be identified.

In some embodiments, the user device 240 includes an instance of an application (e.g., a client-side application) that enables the user device 240 to communicate with one or more other computing systems (e.g., a cloud-computing provider) that perform one or more backend operations using one or more counterpart applications (e.g., server-side applications) and/or through one or more server-side services. The user device 240 may use one or more interfaces 246 to transmit data to and/or receive data from one or more other computing systems (e.g., merchant device 210, server system 220). Additionally, the interfaces 246 may be used to present information to and/or receive user input from one or more users of the user device 240 (e.g., user 202). For example, a user 202 may use the user device 240 to enter into one or more financial transactions and/or to give permission to authorize one or more financial transactions.

The ecosystem 200 includes one or more communication networks 250 that enable information to be communicated between a plurality of computing systems coupled to the communication networks 250 (e.g., merchant device 210, server system 220, user device 240). Example communication networks 250 include a cellular or mobile network and the Internet. Alternatively, the communication networks 250 may include any communication medium that enables the ecosystem 200 to function as described herein including, for example, a personal area network (PAN), a LAN, and/or a WAN.

Figure 3:
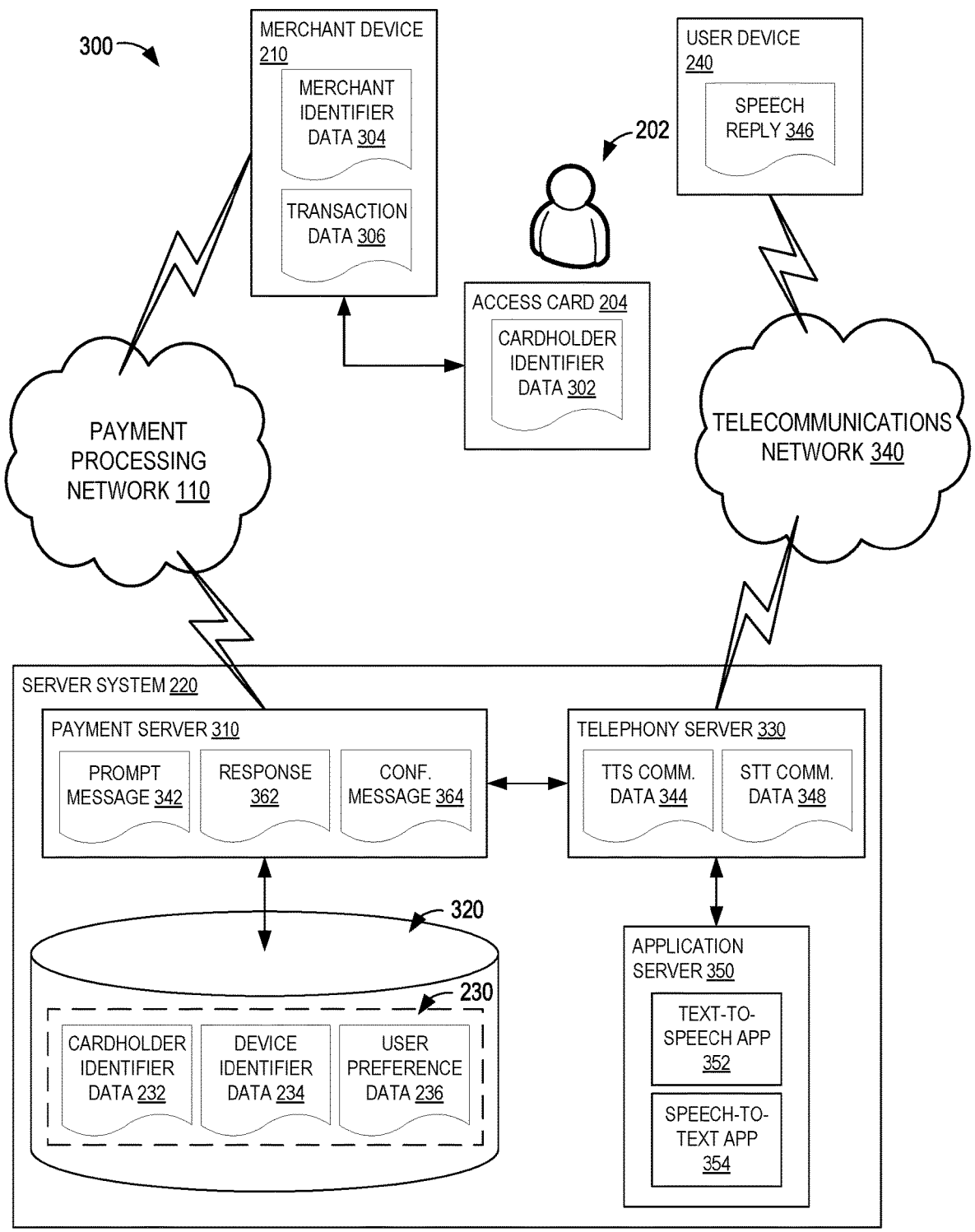
FIG. 3 is a block diagram illustrating an example computing system for obtaining cardholder permission using nonvisual communication in an ecosystem, such as the ecosystem shown in FIG. 2.

FIG. 3 is a block diagram illustrating an example computing system 300 that enables the user 202 to enter into one or more financial transactions and/or to give permission to authorize one or more financial transactions in the ecosystem 200. The merchant device 210 generates a request for authorization that includes cardholder identifier data 302 and merchant identifier data 304 associated with the financial transaction. The cardholder identifier data 302 may be read or received, for example, from the access card 204 and/or from the user device 240, and the merchant identifier data 304 may be retrieved from computer-readable media 212 (shown in FIG. 2).

The request for authorization may also include transaction data 306 associated with the financial transaction. The merchant device 210 may identify one or more products (e.g., goods or services) associated with the financial transaction, and determine or calculate one or more transaction amounts associated with the products. The transaction data 306 may include a transaction amount associated with the financial transaction as a whole (e.g., an aggregate transaction amount). Additionally or alternatively, the transaction data 306 may include one or more transactions amounts corresponding to the products. In this manner, the request for authorization may include transaction data 306 that includes an aggregate transaction amount, one or more transaction amounts associated with one or more products, or a combination thereof. In some embodiments, the merchant device 210 generates a request for authorization that includes product identifier data corresponding to one or more products associated with the financial transaction. Product identifier data may include, for example, a name, a description, an identification number, Universal Product Code (UPC) data, stock-keeping unit (SKU) data, and/or any other information that enables a product to be identified.

The request for authorization is transmitted to the server system 220 via a payment processing network 110. The server system 220 includes a payment server 310 configured to process one or more financial transactions, and a data store 320 that stores and maintains one or more cardholder accounts that may be used to enter into the financial transactions. Upon receiving the request for authorization, the payment server 310 communicates with the data store 320 to identify a first cardholder account 230 associated with the financial transaction. The first cardholder account 230 may include or be associated with, for example, cardholder identifier data 232 that corresponds to the cardholder identifier data 302. In some embodiments, the payment server 310 compares cardholder identifier data 302 associated with the request for authorization with cardholder identifier data associated with the cardholder accounts stored and maintained at the data store 320 to identify the first cardholder account 230.

In some embodiments, the payment server 310 accesses the first cardholder account 230 to identify user preference data 236, and analyzes the user preference data 236 to determine whether the first cardholder account 230 is enrolled in or associated with a nonvisual communication program. On condition that the first cardholder account 230 is associated with the nonvisual communication program, the payment server 310 accesses the first cardholder account 230 to identify device identifier data 234, and uses the device identifier data 234 to establish a communication link with a user device 240. Additionally or alternatively, the merchant device 210 may read or receive contact data from the access card 204 and/or from the user device 240, and transmit the contact data to the payment server 310 for use in establishing the communication link with the user device 240.

The server system 220 includes a gateway or telephony server 330 configured to establish the communication link in or through one or more telephone or telecommunications networks 340. The communication link may be established, for example, using one or more signaling messages, such as an integrated services digital network user part (ISUP) signaling message, a Q signaling (QSIG) signaling message, and/or a digital private network signaling system (DPNSS) signaling message. The telecommunications networks 340 enable information to be communicated between a plurality of communication systems coupled to the telecommunications networks 340 (e.g., server system 220, user device 240). Example telecommunications networks 340 include a landline network (e.g., a public switch telephone network (PSTN)), a private network (e.g., a private branch exchange (PBX)), and a wireless network (e.g., cellular or mobile networks, wireless local area networks (WLANs), wireless sensor networks, satellite communication networks, terrestrial microwave networks). Alternatively, the telecommunications networks 340 may include any communication medium that enables the ecosystem 200 to function as described herein.

The payment server 310 generates a prompt message 342 identifying the merchant 120 associated with the merchant identifier data 304 and one or more transaction amounts associated with the transaction data 306, and transmits the prompt message 342 to the telephony server 330. The telephony server 330 analyzes the prompt message 342 to generate an audible prompt that is audibly perceivable at the user device 240. The audible prompt may be presented at the user device 240, for example, to elicit confirmation of the merchant identifier data 304 and/or the transaction data 306. In some embodiments, the telephony server 330 analyzes the prompt message 342 to generate text-to-speech (TTS) communication data 344, and uses the TTS communication data 344 to present the audible prompt at the user device 240. Additionally, the telephony server 330 may analyze a speech reply 346 to generate speech-to-text (STT) communication data 348, and analyzes the STT communication data 348 to generate a feedback message. In this manner, the telephony server 330 may be used to present nonverbal communication, such as the audible prompt, to a user of the user device 240 (e.g., user 202) and/or perceive nonverbal communication, such as the speech reply 346, from the user of the user device 240.

The telephony server 330 may communicate with an application server 350 to perform one or more functions. The application server 350 may host or manage, for example, one or more applications that include or are associated with speech recognition technology and/or natural language understanding technology. The applications may include a TTS application 352 configured to assemble and produce natural language, and an STT application 354 configured to disassemble and parse natural language. The TTS application 352 may be used to convert text-based communication, such as the prompt message 342, to speech-based communication, such as the audible prompt. For example, the telephony server 330 may use the TTS application 352 to analyze text-based communication to generate TTS communication data 344 that includes transcription data and/or prosody data (e.g., via a text-to-phoneme conversion), and use the TTS communication data 344 to generate vibrations (e.g., using a synthesizer) that produce sound perceivable as speech.

The STT application 354 may be used to convert speech-based communication, such as the speech reply 346, to text-based communication, such as the feedback message. For example, the telephony server 330 may use the STT application 354 to recognize or identify vibrations (e.g., sound) perceived or detected at the user device 240, and analyze the detected vibrations to generate sampled or digitized sound data. The telephony server 330 may use the STT application 354 to analyze the digitized sound data to generate STT communication data 348 that includes transcription data and/or prosody data (e.g., via a voice-to-phoneme conversion), and analyze the STT communication data 348 (e.g., using a statistical modeling system) to generate the feedback message.

The telephony server 330 transmits the feedback message to the payment server 310, and the payment server 310 analyzes the feedback message to determine whether the user of the user device 240 gave permission to authorize the financial transaction. The feedback message may be analyzed, for example, to identify user feedback. If permission was given, the payment server 310 is allowed to authorize the financial transaction. On the other hand, if permission was not given, the payment server 310 is not allowed to authorize the financial transaction. In some embodiments, the payment server 310 analyzes the feedback message to determine whether the permission is associated with one or more products.

In some embodiments, the payment server 310 determines whether the user of the user device 240 is authorized to give permission to authorize the financial transaction. The payment server 310 may use credential data, for example, to authenticate the user of the user device 240. Credential data may be included in the content of the speech (e.g., a recitation of a PIN or a password) and/or in a form of the speech (e.g., a voiceprint). In some embodiments, the payment server 310 analyzes the feedback message to identify credential data. Additionally or alternatively, the payment server 310 may communicate with the telephony server 330 to analyze the speech reply 346 and/or the STT communication data 348 for identifying credential data.

Credential data may be compared with cardholder identifier data 232 (e.g., a PIN, a password, a voiceprint data) to determine whether the user of the user device 240 is associated with the first cardholder account 230. If the credential data corresponds to the cardholder identifier data 232, the payment server 310 determines that the user of the user device 240 is associated with the first cardholder account 230 and, thus, is authorized to give the permission. On the other hand, if the credential data does not correspond to the cardholder identifier data 232, the payment server 310 does not recognize or identify the user of the user device 240 as being authorized to give the permission.

Additionally or alternatively, the payment server 310 may determine that the user of the user device 240 is authorized to give the permission if the user device 240 is associated with the financial transaction. The user device 240 may be recognized or identified as being associated with the financial transaction if a location of the user device 240 (e.g., a device location) is proximate to a location of the merchant device 210 (e.g., a merchant location). For example, the payment server 310 may receive device identifier data from the merchant device 210, and compare the received device identifier data with device identifier data 234 to determine whether the device location is proximate to the merchant location. In some embodiments, the merchant device 210 reads or receives the device identifier data from the user device 240, and transmits the device identifier data to the payment server 310. For another example, the payment server 310 may receive geolocation data associated with the device location from the user device 240, and analyze the geolocation data to determine whether the device location is proximate to the merchant location. The geolocation data may include, for example, a street address, a postal code, a city, a geographic coordinate, and/or any other information that enables a geolocation of the user device 240 to be identified. If the device location is determined to be proximate to the merchant location, the payment server 310 determines that the user of the user device 240 is authorized to give the permission. On the other hand, if the device location is not determined to be proximate to the merchant location, the payment server 310 does not recognize or identify the user of the user device 240 as being authorized to give the permission.

The payment server 310 determines whether to approve or decline the request for authorization, and generates a response 362 to the request in accordance with the determination. The response 362 may be transmitted to the merchant device 210 using the payment processing network 110. In some embodiments, the payment server 310 generates a confirmation message 364 identifying a disposition (e.g., approval, declination) of the request for authorization, and transmits the confirmation message 364 to the telephony server 330 for presentation to the user of the user device 240. For example, the telephony server 330 may analyze the confirmation message 364 to generate an audible confirmation that is audibly perceivable at the user device 240. The audible confirmation may be presented at the user device 240 to inform the user of the user device 240 of the disposition of the request for authorization. In some embodiments, the telephony server 330 analyzes the confirmation message 364 to generate TTS communication data, and uses the TTS communication data to present the audible confirmation at the user device 240.

Figure 4:
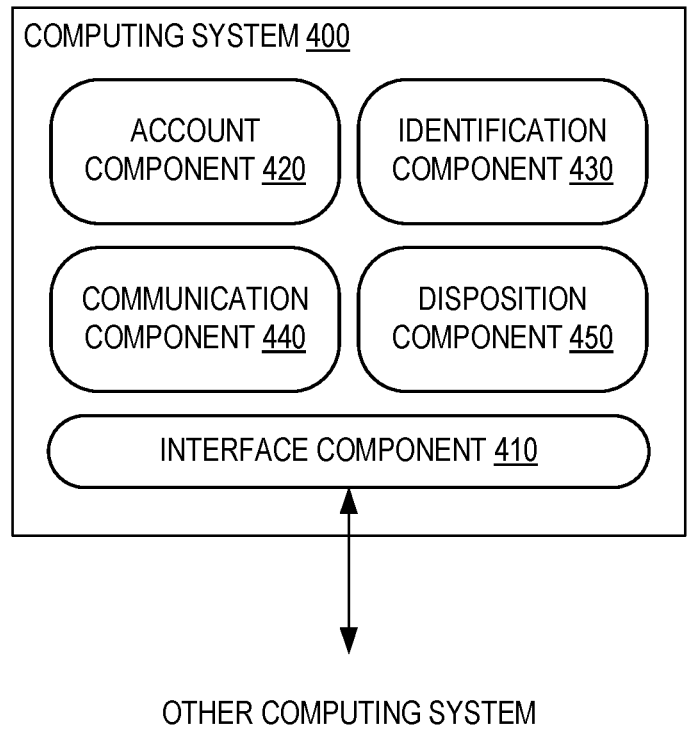
FIG. 4 is a block diagram illustrating example components that may be used to obtain cardholder permission in a computing system, such as the computing system shown in FIG. 3.

FIG. 4 is a block diagram illustrating a computing system 400 (e.g., server system 220) including an interface component 410, an account component 420, an identification component 430, a communication component 440, and/or a disposition component 450 that may be used to obtain permission in the ecosystem 200. In some embodiments, the interface component 410 enables the computing system 400 to receive data from and/or transmit data to one or more other computing systems (e.g., merchant device 210, user device 240). For example, the interface component 410 may be coupled to another computing system to facilitate communication between the other computing system and the account component 420, identification component 430, communication component 440, and/or disposition component 450. In some embodiments, the interface component 410 facilitates communication between and among the account component 420, identification component 430, communication component 440, and/or disposition component 450.

The account component 420 enables the computing system 400 to manage data associated with one or more accounts (e.g., cardholder accounts). Account data stored and maintained at or by the computing system 400 may include data registered with the computing system 400, such as credential data and/or contact data (e.g., cardholder identifier data 232, device identifier data 234). Credential data includes any data that enables an entity (e.g., user 202, user device 240) to be identified and/or authenticated. Credential data may include, for example, an account number, a username, a PIN, a password, a PM certificate, a token, biometric data, and the like. In some embodiments, the account component 420 uses credential data to selectively allow one or more users (e.g., user 202) to access and use account data associated with an account (e.g., first cardholder account 230). For example, the credential data may be used to authenticate the user as an authorized user of the account.

Contact data includes any data that enables an entity (e.g., user 202, user device 240) to be located and/or approached for communicating with the entity (e.g., via the interface component 410). Contact data may include, for example, a telephone number, a BLUETOOTH® brand wireless technology identifier, a routing number, an IP address, a MAC address, an NFC identifier, an RFID identifier, and the like. In some embodiments, the account component 420 uses contact data to communicate with one or more other computing systems (e.g., merchant device 210, user device 240). For example, contact data may be used to establish a communication link with a user device 240 for obtaining permission from a user of the user device 240 (e.g., user 202).

The account component 420 is configured to process one or more registration requests to register data with the computing system 400. Device identifier data 234, for example, may be registered with the computing system 400 to associate a user device 240 with an account (e.g., first cardholder account 230). For another example, user preference data 236 may be registered with the computing system 400 to enroll an entity (e.g., user 202, access card 204, user device 240) and/or an account (e.g., first cardholder account 230) in a nonvisual communication program. The account component 420 is configured to register data with the computing system 400 such that the interface component 410, account component 420, identification component 430, communication component 440, and/or disposition component 450 may access and/or use the data in an efficient manner.

The identification component 430 enables the computing system 400 to identify a request for authorization of a financial transaction, and an account used to enter into the financial transaction. The identification component 430 is configured to communicate (e.g., via the interface component 410) with a merchant device 210 to receive a request for authorization of a financial transaction from the merchant device 210. The request for authorization may include, for example, cardholder identifier data 302, merchant identifier data 304, and/or transaction data 306 associated with the financial transaction.

The identification component 430 is configured to analyze the request for authorization to identify an account associated with the cardholder identifier data 302 (e.g., a first cardholder account 230), a merchant 120 associated with the merchant identifier data 304, and/or one or more transaction amounts associated with the transaction data 306. The identification component 430 may communicate with the account component 420 (e.g., via the interface component 410) to access the account associated with the cardholder identifier data 302 to identify account data (e.g., cardholder identifier data 232, device identifier data 234, user preference data 236) registered with the computing system 400. In some embodiments, the identification component 430 analyzes the request for authorization to identify one or more products associated with product identifier data included in the request and one or more transaction amounts corresponding to the products.

The communication component 440 enables the computing system 400 to establish a communication link with a user device 240 such that the computing system 400 is configured to communicate with the user device 240 (e.g., via the interface component 410). In some embodiments, the communication component 440 establishes the communication link on condition that the request for authorization is to be processed in accordance with a nonvisual communication program. For example, the communication component 440 may identify an account (e.g., first cardholder account 230) associated with the request for authorization, and determine whether the account is enrolled in or associated with the nonvisual communication program. The communication link may be established in or through one or more telecommunications networks 340, such as a PTSN and/or a PBX, to enable the computing system 400 to process the request for authorization in accordance with the nonvisual communication program.

The communication component 440 may use contact data to identify and approach the user device 240 for establishing the communication link. For example, the communication component 440 may call the user device 240 using a telephone number to establish a communication link configured to carry sound transmissions between the computing system 400 and the user device 240. The communication component 440 may communicate with the account component 420 (e.g., via the interface component 410) to retrieve or obtain contact data (e.g., device identifier data 234) registered with the computing system 400 for use in establishing the communication link with a user device 240 associated with the contact data.

The communication component 440 is configured to generate one or more outbound messages (e.g., prompt message 342, confirmation message 364) and convert the outbound messages for presentation at the user device 240 (e.g., via the communication link). The outbound messages may be converted, for example, to one or more nonvisual communications (e.g., an audible communication, a tactile communication) that are perceivable at the user device 240. In some embodiments, the communication component 440 uses merchant identifier data 304 and transaction data 306 to generate a prompt message 342, such that a user of the user device 240 (e.g., user 202) may be prompted to confirm a merchant 120 associated with the merchant identifier data 304 and one or more transaction amounts associated with the transaction data 306. Additionally or alternatively, the communication component 440 may generate a confirmation message 364, such that the user of the user device 240 may be informed of a disposition of the request for authorization.

The communication component 440 is configured to receive one or more user responses (e.g., speech reply 346) from the user device 240 (e.g., via the communication link) and convert the user responses to one or more inbound messages (e.g., feedback message) for processing at the computing system 400. The user responses may be or include, for example, one or more nonvisual communications (e.g., an audible communication, a tactile communication) that are perceivable or detectable at the user device 240. For example, a speech reply 346 and/or a dual-tone multi-frequency (DTMF) signal received from the user device 240 through the communication link may be analyzed to generate one or more inbound messages. The communication component 440 may analyze the inbound messages to identify user feedback associated with the user responses.

The disposition component 450 enables the computing system 400 to authorize one or more financial transactions.

The disposition component 450 is configured to generate a response 362 to the request for authorization, and transmit the response 362 to the merchant device 210. For financial transactions associated with the nonvisual communication program, the request for authorization may be approved on condition that permission to authorize the financial transaction is obtained. In some embodiments, the disposition component 450 obtains permission to authorize the financial transaction as a whole. Alternatively, the disposition component 450 may receive an identification of one or more products included in or excluded from the permission.

User feedback may be analyzed to determine whether permission to authorize a financial transaction is obtained. The disposition component 450 may communicate with the communication component 440 (e.g., via the interface component 410) to obtain the user feedback. In some embodiments, the disposition component 450 determines that permission to authorize a financial transaction is obtained on condition that the user feedback indicates that a user of the user device 240 (e.g., user 202) gave permission to authorize the financial transaction and the user of the user device 240 is authorized to give the permission.

To determine whether permission to authorize a financial transaction was given, the disposition component 450 determines whether the user feedback indicates, includes, or is associated with a confirmation or denial of an outbound message (e.g. prompt message 342). The confirmation and/or denial of an outbound message may be included in the content and/or in the form of the user feedback and/or an inbound message or user response associated with the user feedback. For example, a recitation of "Yes" or a DTMF signal associated with a selection of a first key of a DTMF-compatible keypad (e.g., at the user device 240) may be interpreted as a confirmation, and a recitation of "No" or a DTMF signal associated with a selection of a second key of the DTMF-compatible keypad may be interpreted as a denial. For another example, one form of communication in itself may be interpreted as a confirmation and another form of communication in itself may be interpreted as a denial.

To determine whether there was authorization to give the permission, the disposition component 450 may compare credential data associated with the user feedback with registered data (e.g., cardholder identifier data 232, device identifier data 234) associated with the first cardholder account 230. The credential data may be included in the content and/or in the form of the user feedback, the inbound message, and/or the user response. For example, the identification of credential data that corresponds to cardholder identifier data 232 and/or device identifier data 234 may be used to authenticate the user of the user device 240 and/or the user device 240, respectively, as an authorized source of the permission. The disposition component 450 may communicate with the account component 420 (e.g., via the interface component 410) to retrieve or obtain cardholder identifier data 232 and/or device identifier data 234 registered with the computing system 400 for use in comparing with the credential data.

For another example, the identification of a location of the user device 240 (e.g., a device location) that corresponds to a location of a merchant 120 associated with the merchant device 210 (e.g., a merchant location) may be used to authenticate the user of the user device 240 and/or the user device 240 as an authorized source of the permission. The disposition component 450 may communicate with the user device 240 (e.g., via the interface component 410) to retrieve or obtain geolocation data associated with the user device 240, and/or with the merchant device 210 (e.g., via the interface component 410) to retrieve or obtain geolocation data associated with the merchant device 210 for use in comparing with each other. Additionally or alternatively, the disposition component 450 may communicate with the merchant device 210 to retrieve or obtain device identifier data associated with a user device proximate to the merchant device 210 for use in comparing with device identifier data 234.

Figure 5:
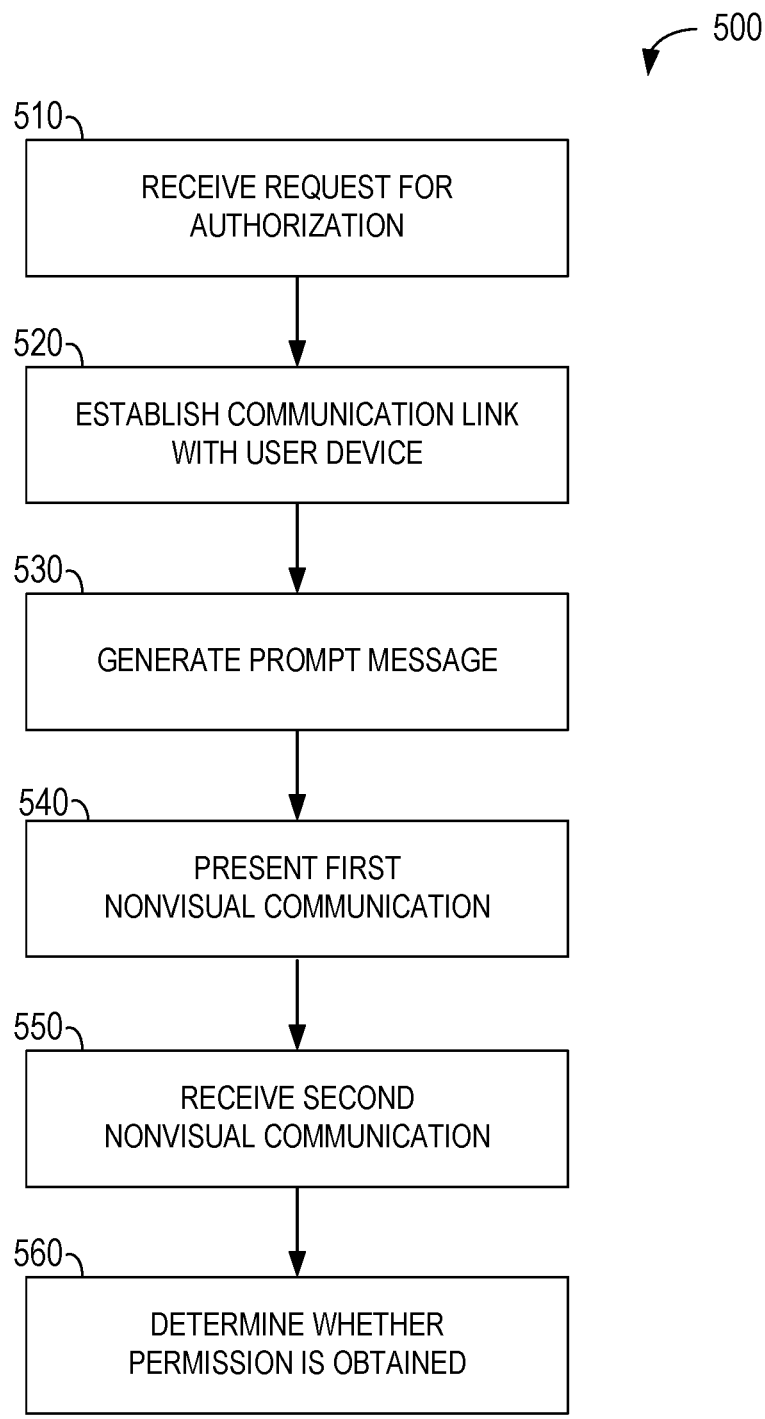
FIG. 5 is a flowchart of an example method for obtaining cardholder permission using nonvisual communication at a computing system, such as the computing system shown in FIG. 3.

FIG. 5 is a flowchart illustrating an example method 500 for obtaining permission using nonvisual communication at a computing system (e.g., server system 220, computing system 400). In some embodiments, a request for authorization of a financial transaction or, more broadly, a transaction is received at 510. The request for authorization is received from a computing device (e.g., merchant device 210). The request for authorization may include first user identifier data associated with the computing device (e.g., merchant identifier data 304), second user identifier data (e.g., cardholder identifier data 302), and transaction data 306 associated with the transaction.

A communication link is established at 520 with a user device 240 associated with the second user identifier data. In some embodiments, the second user identifier data is used to identify and retrieve contact data (e.g., device identifier data 234) associated with the user device 240, and the contact data is used to establish the communication link with the user device 240.

A prompt message 342 is generated at 530. The prompt message 342 may be configured, for example, to elicit confirmation of the first user identifier data and the transaction data 306 included in the request for authorization. In this manner, a user of the user device 240 may be notified of a request for authorization being received. A first nonvisual communication associated with the prompt message 342 is presented at 540 using the communication link. In this manner, the user of the user device 240 may be given an opportunity to provide consent to approve the request for authorization. The prompt message 342 may be converted to the first nonvisual communication using text-to-speech technology (e.g., TTS application 352). The first nonvisual communication may be presented at the user device 240.

A second nonvisual communication associated with the prompt message 342 (e.g., speech reply 346) is received at 550. The second nonvisual communication may be received from the user device 240. The second nonvisual communication is analyzed to determine at 560 whether permission to authorize the transaction is obtained. For example, the second nonvisual communication may be converted to a feedback message using speech-to-text technology (e.g., STT application 354), and the feedback message may be analyzed for determining whether permission to authorize the transaction is obtained.

A disposition of the request for authorization may be determined based on a status of the permission to authorize the transaction. For example, the request for authorization may be approved on condition that the permission is obtained or declined on condition that the permission is not obtained. A response 362 and a confirmation message 364 are generated based on the disposition. The response 362 is transmitted to the computing device, and a third nonvisual communication associated with the confirmation message 364 is presented at the user device 240 using the communication link. The third nonvisual communication is presented to inform a user of the user device 240 of the disposition. The confirmation message 364 may be converted to the third nonvisual communication using text-tospeech technology (e.g., TTS application 352). The third nonvisual communication may be presented at the user device 240.

In some embodiments, the disposition of the request for authorization is generated based on a reliability of the permission. The permission may be determined to be reliable if the user device 240 is associated with the transaction. For example, geolocation data associated with the user device 240 may be used to determine whether the user device 240 is associated with the transaction. In some embodiments, the user device 240 is determined to be associated with the transaction if a location of the user device 240 is proximate to a location of the transaction. For another example, device identifier data associated with a user device proximate to the merchant device 210 may be used to determine whether the user device 240 is associated with the transaction. In some embodiments, the user device 240 is determined to be associated with the transaction if the device identifier data corresponds to the device identifier data 234 associated with an account associated with the transaction (e.g., first cardholder account 230).

Additionally or alternatively, the permission may be determined to be reliable if the user device 240 and/or the user of the user device 240 are authenticated as being associated with the account associated with the transaction. Credential data received from the user device 240 may be used to authenticate the user device 240 and/or the user of the user device 240. In some embodiments, the second nonvisual communication is analyzed to identify credential data for authenticating the user device 240 and/or the user of the user device 240. The credential data may be compared with registered data associated with the second user identifier data (e.g., cardholder identifier data 232, device identifier data 234) to authenticate the user device 240 and/or the user of the user device 240 (e.g., user 202).

Figure 6:
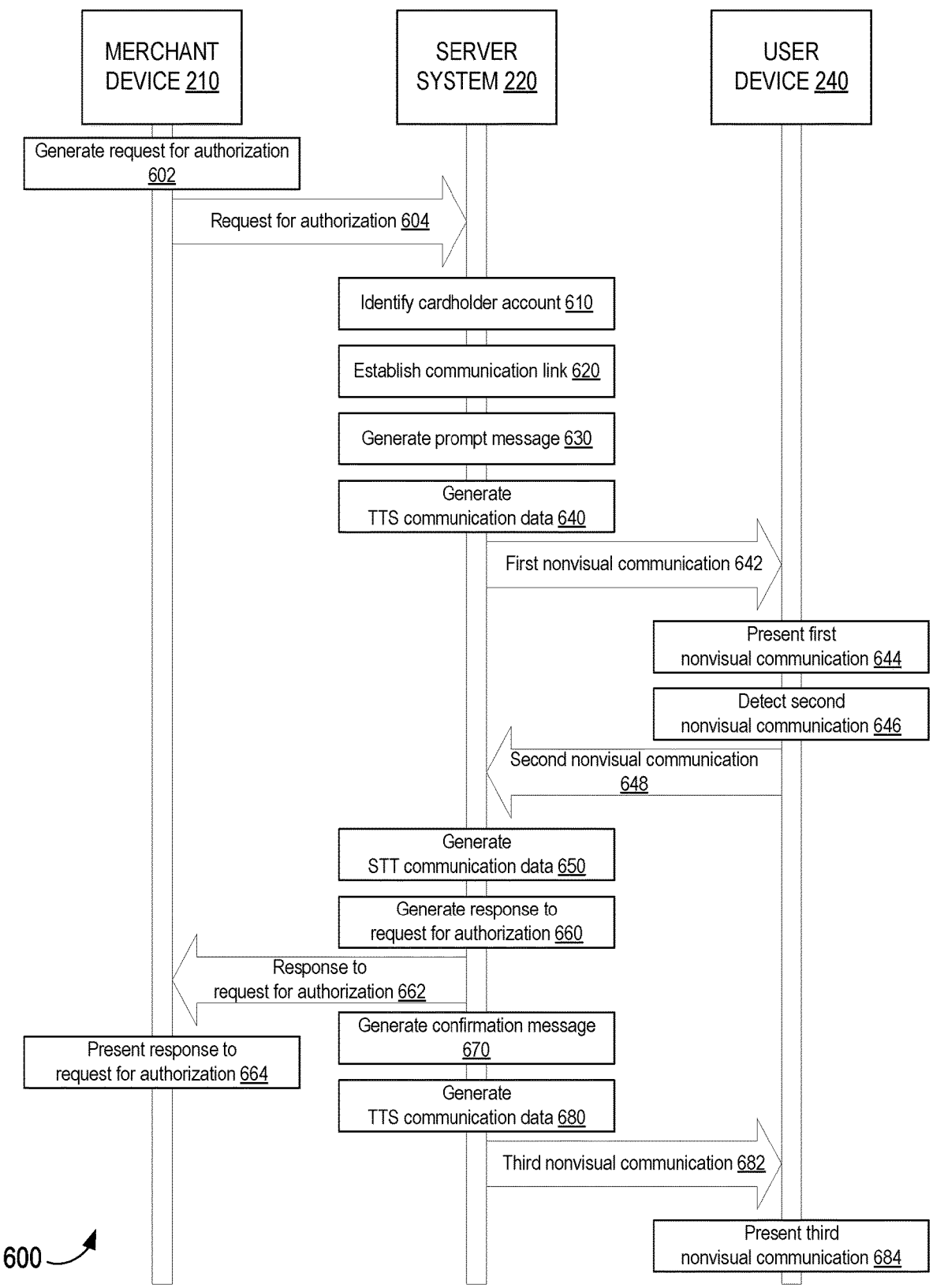
FIG. 6 is a sequence diagram of an example method for obtaining cardholder permission using nonvisual communication in an ecosystem, such as the ecosystem shown in FIG. 2.

FIG. 6 is a sequence diagram illustrating an example method 600 for obtaining cardholder permission using nonvisual communication in the ecosystem 200. In some embodiments, a merchant device 210 uses account information read or received from an access card 204 and/or user device 240 to generate at 602 a request for authorization. The request for authorization may include, for example, cardholder identifier data 302, merchant identifier data 304, and transaction data 306. In some embodiments, the request for authorization includes data indicative of an enrollment status associated with a nonvisual communication program. The request for authorization is transmitted at 604 to a server system 220 for processing.

Upon receiving the request for authorization, the server system 220 identifies at 610 a cardholder account (e.g., first cardholder account 230) associated with the request. In some embodiments, the server system 220 determines whether the cardholder account is associated with the nonvisual communication program. For example, data extracted from the request for authorization may be indicative of the enrollment status. For another example, user preference data 236 associated with the cardholder account may be indicative of the enrollment status. On condition that the cardholder account is associated with the nonvisual communication program, the server system 220 communicates with a user device 240 to obtain, from a user of the cardholder account (e.g., cardholder 160), cardholder permission to approve the request for authorization.

In some embodiments, the server system 220 establishes at 620 a communication link to obtain the cardholder permission from the user of the cardholder account. For example, the server system 220 may identify contact data (e.g., device identifier data 234) associated with the cardholder account, and use the contact data to establish the communication link with a user device 240 associated with the cardholder account.

The server system 220 uses the merchant identifier data 304 and/or transaction data 306 to generate at 630 a prompt message 342. The prompt message 342 is analyzed to generate at 640 TTS communication data 344 that enables a first nonvisual communication (e.g., an audible prompt) to be transmitted at 642 to a user device 240 (e.g., via the communication link) for presentation at 644. The first nonvisual communication may be presented, for example, such that the user device 240 recites, "Your account has been used to make a [TRANSACTION AMOUNT] payment at [MERCHANT]. Do you approve?", wherein [TRANSACTION AMOUNT] is associated with the transaction data 306 and [MERCHANT] is associated with the merchant identifier data 304.

The user device 240 detects at 646 second nonvisual communication (e.g., speech reply 346) and transmits at 648 the second nonvisual communication to the server system 220 (e.g., via the communication link). Upon receiving the second nonvisual communication, the server system 220 analyzes the second nonvisual communication to generate at 650 STT communication data 348. The STT communication data 348 may be analyzed to determine whether a user of the user device 240 gave cardholder permission to approve the request for authorization.

The server system 220 generates at 660 a response 362 to the request for authorization. The response 362 may be generated based on a status of the cardholder permission to approve the request for authorization. For example, if the cardholder permission to approve the request for authorization is obtained, the server system 220 may generate a response 362 that approves the request. On the other hand, if the cardholder permission to approve the request for authorization is not obtained, the server system 220 may not generate a response 362 that approves the request. The response 362 is transmitted at 662 to the merchant device 210 for presentation at 664.

In some embodiments, the server system 220 generates at 670 a confirmation message 364 associated with a disposition of the request for authorization. The confirmation message 364 is generated to inform the user of the user device 240 of the disposition. If the request for authorization is approved, the server system 220 generates a confirmation message 364 that indicates that the request is approved. If the request for authorization is not approved, the server system 220 generates a confirmation message 364 that indicates that the request is declined.

The confirmation message 364 is analyzed to generate at 680 TTS communication data that enables a third nonvisual communication (e.g., an audible confirmation) to be transmitted at 682 to the user device 240 (e.g., via the communication link) for presentation at 684. The third nonvisual communication may be presented, for example, such that the user device 240 recites, "Your transaction at [MERCHANT] has been approved", wherein [MERCHANT] is associated with the merchant identifier data 304.

Figure 7:
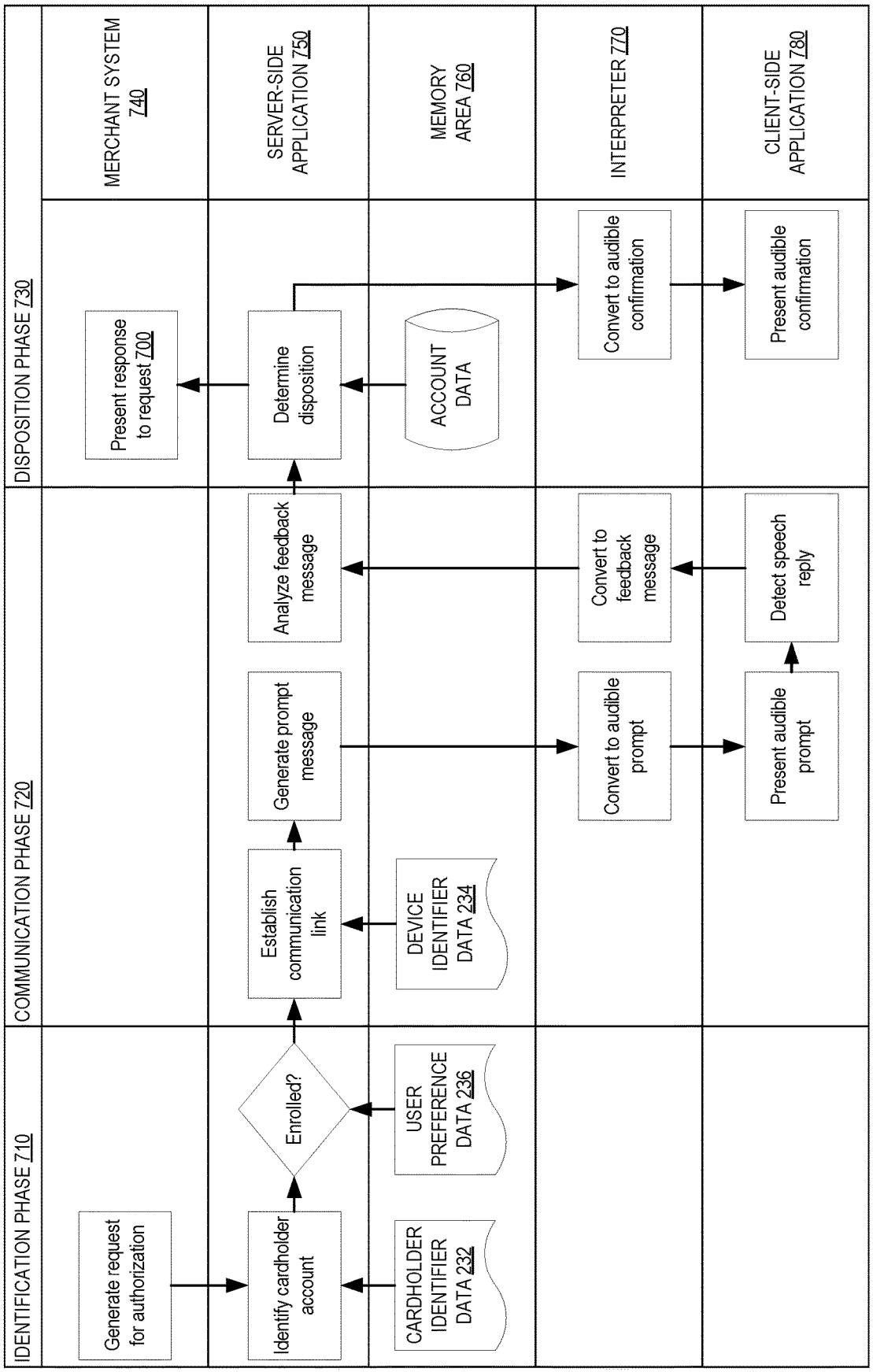
FIG. 7 is a flow diagram of an example dataflow for obtaining cardholder permission using nonvisual communication in an ecosystem, such as the environment shown in FIG. 2.

FIG. 7 is a flow diagram illustrating an example dataflow 700 for obtaining cardholder permission using nonvisual communication in the ecosystem 200. The dataflow 700 includes an identification phase 710, in which a request for authorization of a financial transaction and an account used to enter into the financial transaction may be identified; a communication phase 720, in which a communication link may be established with a user device 240; and a disposition phase 730, in which the financial transaction may be authorized.

During the identification phase 710, a request for authorization generated at a merchant system 740 (e.g., merchant device 210) is received using a server-side application 750 (e.g., at a server system 220 or at a payment server 310). The server-side application 750 analyzes the request for authorization to identify a cardholder account (e.g., first cardholder account 230) associated with the request. The cardholder account may be identified, for example, based on cardholder identifier data 232 associated with the cardholder account. In some embodiments, the cardholder identifier data 232 is stored and maintained at a memory area 760 (e.g., data store 320).

The server-side application 750 determines whether the cardholder account is enrolled in a nonvisual communication program. User preference data 236 associated with the cardholder account may be used to determine an enrollment status. If the cardholder account is enrolled in the nonvisual communication program, the dataflow 700 enters the communication phase 720. On the other hand, if the cardholder account is not enrolled in the nonvisual communication program, the dataflow 700 enters the disposition phase 730 to determine a disposition of the request for authorization without obtaining cardholder permission (e.g., via the communication phase 720).

During the communication phase 720, a communication link is established with a user device 240 using the server-side application 750. The user device 240 may be identified using device identifier data 234 associated with the cardholder account. In some embodiments, the device identifier data 234 is stored and maintained at the memory area 760. The server-side application 750 generates a prompt message 342 to elicit a reply from a user of the user device 240. An interpreter 770 (e.g., telephony server 330), for example, may convert the prompt message 342 to an audible prompt that is presented using a client-side application 780 (e.g., at the user device 240). Upon detecting a speech reply (e.g., using the client-side application 780), the interpreter 770 converts the speech reply to a feedback message, and the server-side application 750 analyzes the feedback message to identify user feedback.

During the disposition phase 730, a disposition of the request for authorization is determined using the server-side application 750. The server-side application 750 determines the disposition using account data. For example, the server-side application 750 may determine whether the cardholder account is in good standing and/or whether a transaction amount (e.g., associated with transaction data 306) is less than an account capacity. In some embodiments, the account data is stored and maintained at the memory area 760.

In some embodiments, the server-side application 750 determines the disposition based on user feedback. User feedback may be used to determine the disposition, for example, if a cardholder account associated with the request for authorization is enrolled in the nonvisual communication program. The user feedback may indicate whether cardholder permission to approve the request for authorization is obtained. In this manner, a request for authorization associated with a cardholder account enrolled in the nonvisual communication program may not be approved without obtaining the cardholder permission.

The server-side application 750 transmits a response 362 to the request for authorization to the merchant system 740. In some embodiments, the interpreter 770 converts a confirmation message 364 associated with the disposition to an audible confirmation that is presented at the user device 240 using the client-side application 780. In this manner, the confirmation message 364 may be used to provide confirmation of the approval or declination of the request for authorization.

Figure 8:
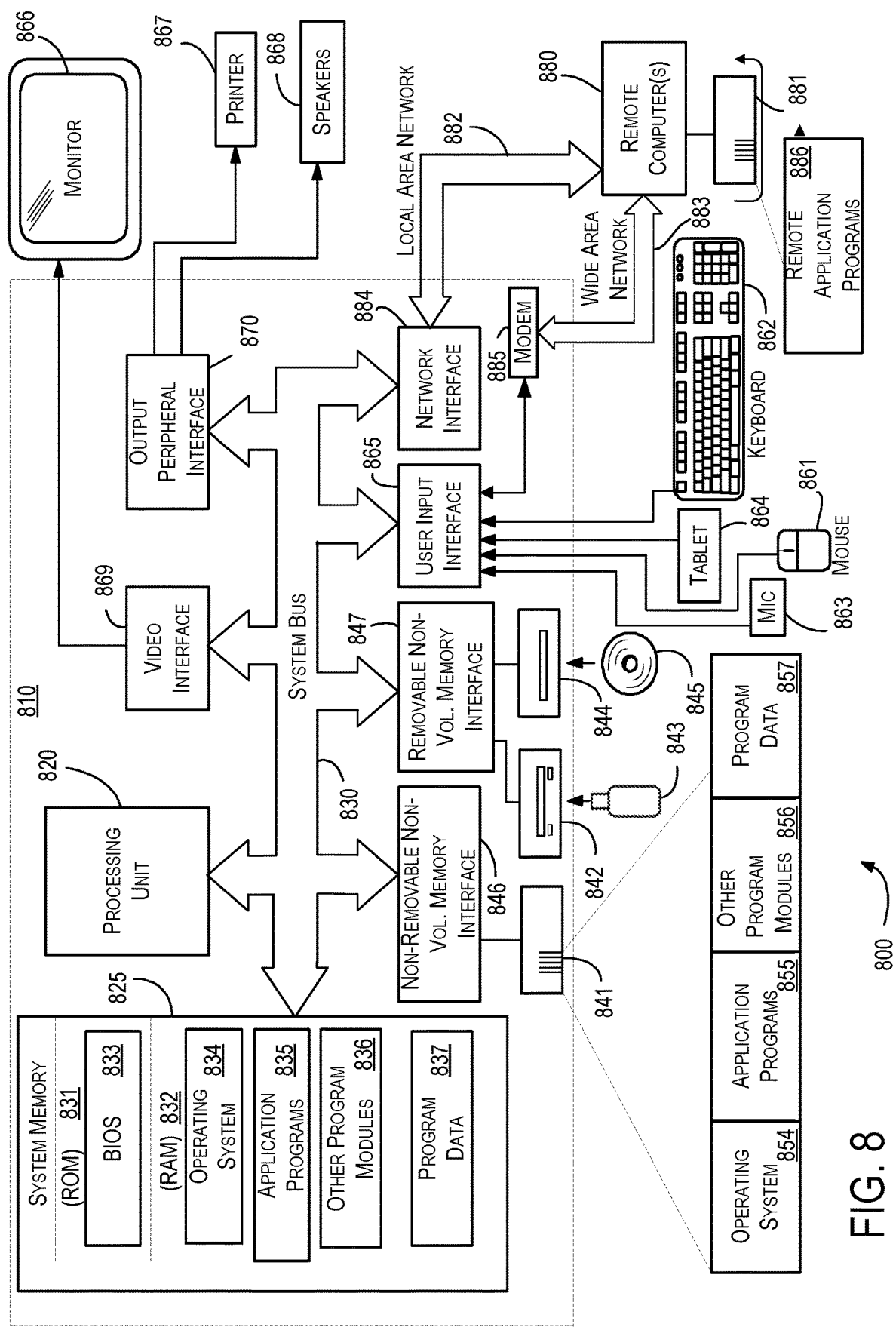
FIG. 8 is a block diagram illustrating an example operating environment in which operations may be performed to process financial transactions.

FIG. 8 is a block diagram illustrating an example operating environment 800 that may be used to process one or more financial transactions, including obtaining permission to authorize the financial transactions. The operating environment 800 is only one example of a computing and networking environment and is not intended to suggest any limitation as to the scope of use or functionality of the disclosure. The operating environment 800 should not be interpreted as having any dependency or requirement relating to any one or combination of components illustrated in the example operating environment 800.

The disclosure is operational with numerous other computing and networking environments or configurations. While some embodiments of the disclosure are illustrated and described herein with reference to the operating environment 800 being or including a server system 220 (shown in FIG. 2), a computing system 400 (shown in FIG. 4), and/or a server-side application 750 (shown in FIG. 7), aspects of the disclosure are operable with any computing system (e.g., access card 204, merchant device 210, user device 240, payment server 310, telephony server 330, application server 350) that executes instructions to implement the operations and functionality associated with the operating environment 800.

For example, the operating environment 800 may include a mobile device, a tablet, a laptop computer, a desktop computer, a server computer, a microprocessor-based system, a multiprocessor system, a communication devices in a wearable or accessory form factor (e.g., a watch, glasses, a headset, earphones, and the like), programmable consumer electronics, a portable media player, a gaming console, a set top box, a kiosk, a tabletop device, an industrial control device, a minicomputer, a mainframe computer, a network computer, a distributed computing environment that includes any of the above systems or devices, and the like. The operating environment 800 may represent a group of processing units or other computing systems. Additionally, any computing system described herein may be configured to perform any operation described herein including one or more operations described herein as being performed by another computing system.

With reference to FIG. 8, an example system for implementing various aspects of the disclosure may include a general purpose computing system in the form of a computer 810. Components of the computer 810 may include, but are not limited to, a processing unit 820 (e.g., a processor), a system memory 825 (e.g., a computer-readable storage device), and a system bus 830 that couples various system components including the system memory 825 to the processing unit 820. The system bus 830 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The system memory 825 includes any quantity of media associated with or accessible by the processing unit 820. For example, the system memory 825 may include computer storage media in the form of volatile and/or nonvolatile memory, such as read only memory (ROM) 831 and random access memory (RAM) 832. The ROM 831 may store a basic input/output system (BIOS) 833 that facilitates transferring information between elements within computer 810, such as during start-up. The RAM 832 may contain data and/or program modules that are immediately accessible to and/or presently being operated on by processing unit 820. For example, the system memory 825 may store computer-executable instructions, application data, transaction data, identifier data, profile data, location data, product data, linguistic data, and other data. By way of example, and not limitation, FIG. 8 illustrates operating system 834, application programs 835, other program modules 836, and program data 837.

The computer 810 includes a variety of computer-readable media. Computer-readable media may be any available media that may be accessed by the computer 810 and includes both volatile and nonvolatile media, and removable and non-removable media. By way of example, and not limitation, computer-readable media may comprise computer storage media and communication media. Computer storage media are tangible and mutually exclusive to communication media.

Computer storage media includes volatile and nonvolatile, removable and non-removable media implemented in any method or technology, such as semiconductor, magnetic, or optical technologies, for storage of information, such as computer-executable instructions, data structures, program modules or other data. Example computer storage media includes, but is not limited to, ROM 831, RAM 832, electrically erasable programmable read-only memory (EE-PROM), solid-state memory, flash memory, a hard disk, magnetic storage, floppy disk, magnetic tape, a compact disc (CD), a digital versatile disc (DVD), a BLU-RAY DISC® brand optical disc, an ultra density optical (UDO) disc, or any other medium which may be used to store the desired information and which may be accessed by the computer 810. (BLU-RAY DISC® is a registered trademark of Blu-ray Disc Association located in Burbank, Calif.). Computer storage media are implemented in hardware and exclude carrier waves and propagated signals. Computer storage media for purposes of this disclosure are not signals per se.

Communication media typically embodies computer-executable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

By way of example only, FIG. 8 illustrates a hard disk drive 841 that reads from or writes to non-removable, nonvolatile magnetic media, a universal serial bus (USB) port 842 that reads from or writes to a removable, nonvolatile memory 843, and an optical disk drive 844 that reads from or writes to a removable, nonvolatile optical disk 845. Other removable/non-removable, volatile/nonvolatile computer storage media that may be used in the example operating environment include, but are not limited to, solid state memory, flash memory, and the like. The hard disk drive 841 may be connected to the system bus 830 through a non-removable memory interface such as interface 846, and magnetic disk drive 842 and optical disk drive 844 may be connected to the system bus 830 by a removable memory interface, such as interface 847.

The drives and their associated computer storage media, described above and illustrated in FIG. 8, provide storage of computer-executable instructions, data structures, program modules, components (e.g., interface component 410, account component 420, identification component 430, communication component 440, disposition component 450), applications (e.g., TTS application 352, STT application 354), and other data for the computer 810. In FIG. 8, for example, hard disk drive 841 is illustrated as storing operating system 854, application programs 855, other program modules 856 and program data 857. Note that these components may either be the same as or different from operating system 834, application programs 835, other program modules 836, and program data 837. Operating system 854, application programs 855, other program modules 856, and program data 857 are given different numbers herein to illustrate that, at a minimum, they are different copies.

The processing unit 820 includes any quantity of processing units, and the instructions may be performed by the processing unit 820 or by multiple processors within the operating environment 800 or performed by a processor external to the operating environment 800. The processing unit 820 may be programmed to execute the computer-executable instructions for implementing aspects of the disclosure, such as those illustrated in the figures (e.g., FIGS. 5-7). For example, the processing unit 820 may execute an interface component 410 (shown in FIG. 4), an account component 420 (shown in FIG. 4), an identification component 430 (shown in FIG. 4), a communication component 440 (shown in FIG. 4), and/or a disposition component 450 (shown in FIG. 4) for implementing aspects of the disclosure.

Upon programming or execution of these components, the operating environment 800 and/or processing unit 820 is transformed into a special purpose microprocessor or machine. For example, the identification component 430, when executed by the processing unit 820, causes the computer 810 to receive a request for authorization of a financial transaction, and analyze the request for authorization to identify a cardholder account, a merchant, and/or a transaction amount associated with the request for authorization; the communication component 440, when executed by the processing unit 820, causes the computer 810 to establish a communication link with a user device associated with a cardholder account, generate a prompt message identifying a merchant and/or a transaction amount, convert the prompt message to an audible prompt, present the audible prompt to the user device through the communication link, identify a speech reply received from the user device through the communication link, and analyze the speech reply to identify user feedback; and the disposition component 450, when executed by the processing unit 820, causes the computer 810 to analyze user feedback to determine whether cardholder permission to authorize a financial transaction is obtained. Although the processing unit 820 is shown separate from the system memory 825, embodiments of the disclosure contemplate that the system memory 825 may be onboard the processing unit 820 such as in some embedded systems.

A user (e.g., user 202) may enter commands and information into the computer 810 through one or more input devices, such as a pointing device 861 (e.g., mouse, trackball, touch pad), a keyboard 862, a microphone 863, and/or an electronic digitizer 864 (e.g., on a touchscreen). Other input devices not shown in FIG. 8 may include a joystick, a game pad, a controller, a satellite dish, a camera, a scanner, an accelerometer, or the like. The computer 810 may accept input from the user in any way, including from input devices, via gesture input, via proximity input (such as by hovering), and/or via voice input. These and other input devices may be coupled to the processing unit 820 through a user input interface 865 that is coupled to the system bus 830, but may be connected by other interface and bus structures, such as a parallel port, game port or the USB port 842.

Information, such as text, images, audio, video, graphics, alerts, and the like, may be presented to a user via one or more presentation devices, such as a monitor 866, a printer 867, and/or a speaker 868. Other presentation devices not shown in FIG. 8 may include a projector, a vibrating component, or the like. These and other presentation devices may be coupled to the processing unit 820 through a video interface 869 (e.g., for a monitor 866 or a projector) and/or an output peripheral interface 870 (e.g., for a printer 867, a speaker 868, and/or a vibration component) that are coupled to the system bus 830, but may be connected by other interface and bus structures, such as a parallel port, game port or the USB port 842. In some embodiments, the presentation device is integrated with an input device configured to receive information from the user (e.g., a capacitive touch-screen panel, a controller including a vibrating component). Note that the monitor 866 and/or touch screen panel may be physically coupled to a housing in which the computer 810 is incorporated, such as in a tablet-type personal computer.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in FIG. 8. The logical connections depicted in FIG. 8 include one or more LANs 882 and one or more WANs 883, but may also include other networks. Such networking environments are commonplace in offices, enterprise-wide computer networks, intranets and the Internet.

When used in a LAN networking environment, the computer 810 is coupled to the LAN 882 through a network interface or adapter 884. When used in a WAN networking environment, the computer 810 may include a modem 885 or other means for establishing communications over the WAN 883, such as the Internet. The modem 885, which may be internal or external, may be connected to the system bus 830 via the user input interface 865 or other appropriate mechanism. A wireless networking component including an interface and antenna may be coupled through a device, such as an access point or peer computer to a LAN 882 or WAN 883. In a networked environment, program modules depicted relative to the computer 810, or portions thereof, may be stored in the remote memory storage device. By way of example, and not limitation, FIG. 8 illustrates remote application programs 886 as residing on memory storage device 881. It may be appreciated that the network connections shown are examples and other means of establishing a communications link between the computers may be used.

The block diagram of FIG. 8 is merely illustrative of an example system that may be used in connection with one or more examples of the disclosure and is not intended to be limiting in any way. Further, peripherals or components of the computing systems known in the art are not shown, but are operable with aspects of the disclosure. At least a portion of the functionality of the various elements in FIG. 8 may be performed by other elements in FIG. 8, or an entity (e.g., processor, web service, applications, server, computing system, etc.) not shown in FIG. 8.

Although described in connection with an example computing system environment, embodiments of the disclosure are capable of implementation with numerous other general purpose or special purpose computing system environments, configurations, or devices. Embodiments of well-known computing systems, environments, and/or configurations that may be suitable for use with aspects of the disclosure include, but are not limited to, mobile devices, tablets laptop computers, desktop computers, server computers, microprocessor-based systems, multiprocessor systems, programmable consumer electronics, communication devices in wearable or accessory form factors, portable media players, gaming consoles, set top boxes, kiosks, tabletop devices, industrial control devices, minicomputers, mainframe computers, network computers, distributed computing environments that include any of the above systems or devices, and the like.

Embodiments of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein.

In some embodiments, the operations illustrated in the drawings may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

The embodiments illustrated and described herein as well as embodiments not specifically described herein but within the scope of aspects of the disclosure constitute example means for obtaining permission using nonvisual communication to authorize one or more transactions. For example, the elements illustrated in FIGS. 1-4 and 8, such as when encoded to perform the operations illustrated in FIGS. 5-7, constitute at least an example means for receiving a request for authorization of a transaction (e.g., interface component 410, identification component 430); an example means for establishing a communication link with a communication device (e.g., interface component 410, communication component 440); an example means for generating a message configured to elicit a reply (e.g., communication component 440); an example means for presenting nonvisual communication at a communication device (e.g., interface component 410, communication component 440); an example means for receiving nonvisual communication from a communication device (e.g., interface component 410, communication component 440); and an example means for analyzing nonvisual communication to determine whether permission to authorize a transaction is obtained (e.g., communication component 440, disposition component 450).

When introducing elements of aspects of the disclosure or the embodiments thereof, the articles "a," "an," "the," and "said" are intended to mean that there are one or more of the elements. Furthermore, references to an "embodiment" or "example" of the present disclosure are not intended to be interpreted as excluding the existence of additional embodiments or examples that also incorporate the recited features. The terms "comprising," "including," and "having" are intended to be inclusive and mean that there may be additional elements other than the listed elements. The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the aspects of the disclosure have been described in terms of various embodiments with their associated operations, a person skilled in the art would appreciate that a combination of operations from any number of different embodiments is also within the scope of the aspects of the disclosure.

What is claimed is:

1. A computing system for obtaining cardholder permission using nonvisual communication to authorize one or more financial transactions, the computing system comprising:
   an interpreter configured to convert text to speech and speech to text;
   a memory device storing data associated with one or more cardholder accounts, and computer-executable instructions; and
   a processor configured to execute the computer-executable instructions and:
      receive, from a merchant device, a request for authorization of a first financial transaction of the one or more financial transactions, the request for authorization including cardholder identifier data, merchant identifier data, and transaction data;
      based on the cardholder identifier data, identify a first cardholder account of the one or more cardholder accounts;
      establish a communication link between the interpreter and a user device associated with the first cardholder account wherein the computing system is configured to communicate with the user device;
      based on the merchant identifier data and the transaction data, generate a prompt message identifying a merchant associated with the merchant identifier data and one or more transaction amounts associated with the transaction data;
      analyze user preference data to determine whether the first cardholder account is enrolled to communicate via a nonvisual communication program;
      on condition that the first cardholder account is determined to be enrolled to communicate via a nonvisual communication program, analyze the prompt message using the interpreter and generate an audible prompt audibly perceivable at the user device;
      analyze a speech reply received from the user device using the interpreter and generate a feedback message; and
      analyze the feedback message and determine whether cardholder permission to authorize the first financial transaction is obtained.

2. The computing system of claim 1, wherein the processor further executes the computer-executable instructions and determines whether a user of the user device is authorized to give permission to the first financial transaction by checking whether the speech reply includes one or more of the following: a recitation of a password and a personal identification number.

3. The computing system of claim 1, wherein the processor further executes the computer-executable instructions and establishes the communication link based on contact data included in data associated with the first cardholder account, the contact data including one or more of the following: an Internet Protocol address (IP address) and a Media Access Control Address (MAC Address) of the user device.

4. The computing system of claim 1, wherein the processor is further configured to execute the computer-executable instructions to:
   identify a location of the merchant device;
   receive geolocation data associated with the user device; and
   analyze the geolocation data and determine whether the user device is proximate to the location of the merchant device.

5. The computing system of claim 1, wherein the processor further executes the computer-executable instructions to:
   access the first cardholder account to retrieve voiceprint data; and
   compare the speech reply received from the user device with the voiceprint data and determine whether the user of the user device is associated with the first cardholder account.

6. The computing system of claim 1, wherein the processor further executes the computer-executable instructions to:
   generate a response to the request for authorization; and
   transmit, to the merchant device, the response to the request for authorization.

7. The computing system of claim 1, wherein the processor further executes the computer-executable instructions to:
   generate a confirmation message identifying a disposition of the request for authorization; and
   analyze the confirmation message using the interpreter and generate an audible confirmation audibly perceivable at the user device.

8. The computing system of claim 1, wherein the processor further executes the computer-executable instructions to:
   generate the prompt message and identify at least one product associated with the one or more transaction amounts; and analyze the feedback message and determine whether the at least one product is associated with the cardholder permission.

9. One or more non-transitory computer storage media embodied with computer-executable instructions, that when executed by a processor perform operations comprising:
   receiving a request for authorization of a financial transaction, analyzing the request for authorization, and identifying a cardholder account, a merchant, and one or more transaction amounts associated with the request for authorization;
   establishing a communication link with a user device associated with the cardholder account, generating a prompt message identifying the merchant and the one or more transaction amounts, and analyzing user preference data to determine whether the cardholder account is enrolled to communicate via a nonvisual communication program,
   on condition that the cardholder account is determined to be enrolled to communicate via a nonvisual communication program, converting the prompt message to an audible prompt, presenting the audible prompt to the user device through the communication link, identifying a speech reply received from the user device through the communication link, and analyzing the speech reply to identify user feedback; and
   analyzing the user feedback to determine whether cardholder permission to authorize the financial transaction is obtained.

10. The one or more non-transitory computer storage media of claim 9, that when executed by a processor perform further operations comprising: determining whether a user of the user device is authorized to give permission to the first financial transaction by checking whether the speech reply includes one or more of the following: a recitation of a password and a personal identification number.

11. The one or more non-transitory computer storage media of claim 9, that when executed by a processor perform further operations comprising: establishing the communication link based on contact data included in data associated with the cardholder account, the contact data including one or more of the following: an Internet Protocol address (IP address) and a Media Access Control Address (MAC Address) of the user device.

12. The one or more non-transitory computer storage media of claim 9, that when executed by a processor perform further operations comprising:
   identifying a location of the merchant device;
   receiving geolocation data associated with the user device;
   analyzing the geolocation data; and
   determining whether the user device is proximate to the location of the merchant device.

13. The one or more non-transitory computer storage media of claim 9, that when executed by a processor perform further operations comprising:
   retrieving voiceprint data associated with the cardholder account;
   comparing the speech reply with the voiceprint data; and
   determining whether the user of the user device is associated with the cardholder account.

14. The one or more computer non-transitory storage media of claim 9, that when executed by a processor perform further operations comprising:
   generating a confirmation message identifying a disposition of the request for authorization, converting the confirmation message to an audible confirmation, and presenting the audible confirmation to the user device through the communication link; and
   generating a response to the request for authorization, and transmitting the response to the merchant device.

15. A computer-implemented method for obtaining permission using nonvisual communication to authorize one or more transactions, the computer-implemented method comprising:
   receiving, from a computing device, a request for authorization of a first transaction of the one or more transactions, the request for authorization including first user identifier data associated with the computing device, second user identifier data, and transaction data associated with the first transaction;
   based on the first user identifier data, identifying a cardholder account;
   establishing a communication link with a user device associated with the second user identifier data;
   generating a prompt message configured to elicit confirmation of the first user identifier data and the transaction data;
   analyzing user preference data to determine whether the cardholder account is enrolled to communicate via a nonvisual communication program;
   on condition that the cardholder account is determined to be enrolled to communicate via a nonvisual communication program, using the communication link to present, at the user device, a first nonvisual communication associated with the prompt message;
   receiving, from the user device, a second nonvisual communication associated with the prompt message; and
   analyzing the second nonvisual communication and determining whether permission to authorize the first transaction is obtained.

16. The computer-implemented method of claim 15, wherein the second nonvisual communication comprises a speech reply, the method further comprising checking whether the speech reply includes one or more of the following: a recitation of a password and a personal identification number.

17. The computer-implemented method of claim 15, wherein:
   using the communication link comprises converting the prompt message to the first nonvisual communication; and
   analyzing the second nonvisual communication comprises converting the second nonvisual communication to a feedback message.

18. The computer-implemented method of claim 15, further comprising:
   identifying a first location of the computing device;
   receiving geolocation data associated with a second location of the user device;
   analyzing the geolocation data; and
   determining whether the second location is proximate to the first location.

19. The computer-implemented method of claim 15, further comprising:
   establishing the communication link based on contact data included in the second user identifier data, the contact data including one or more of the following: an Internet Protocol address (IP address) and a Media Access Control Address (MAC Address) of the user device.

20. The computer-implemented method of claim 15, further comprising:
   transmitting, to the computing device, a response to the request for authorization; and using the communication link to present, at the user device, a third nonvisual communication associated with a disposition of the request for authorization.

\* \* \* \* \*